(12) United States Patent
Frazier et al.

(10) Patent No.: US 6,901,428 B1
(45) Date of Patent: May 31, 2005

(54) ACCESSING DATA FROM A DATABASE OVER A NETWORK

(75) Inventors: John D. Frazier, Romona, CA (US); Michael L. Reed, San Diego, CA (US); Diane M. Wewerka, Poway, CA (US)

(73) Assignee: NCR Corporation, Dayton, OH (US)

( * ) Notice: Subject to any disclaimer, the term of this patent is extended or adjusted under 35 U.S.C. 154(b) by 733 days.

(21) Appl. No.: 09/686,299

(22) Filed: Oct. 11, 2000

(51) Int. Cl.[7] ............................................. G06F 15/16
(52) U.S. Cl. ........................ 709/203; 709/217; 707/9; 707/102; 707/201
(58) Field of Search ........................ 709/203, 217–218, 709/224–225, 227–229, 219; 707/3, 9, 100, 102, 201, 8, 10, 202

(56) References Cited

U.S. PATENT DOCUMENTS

| | | | | |
|---|---|---|---|---|
| 5,870,549 A | * | 2/1999 | Bobo, II ...................... 709/206 |
| 5,987,454 A | * | 11/1999 | Hobbs ............................ 707/4 |
| 6,012,068 A | * | 1/2000 | Boezeman et al. ....... 707/104.1 |
| 6,173,287 B1 | * | 1/2001 | Eberman et al. ............ 707/102 |
| 6,360,215 B1 | * | 3/2002 | Judd et al. ...................... 707/3 |
| 6,363,398 B1 | * | 3/2002 | Andersen ................ 707/103 R |
| 6,401,094 B1 | * | 6/2002 | Stemp et al. .................. 707/10 |
| 6,665,657 B1 | * | 12/2003 | Dibachi .......................... 707/3 |
| 6,681,227 B1 | * | 1/2004 | Kojima et al. ................ 707/10 |
| 2002/0026443 A1 | * | 2/2002 | Chang et al. .................. 707/10 |

OTHER PUBLICATIONS

U.S. Appl. No. 09/629,232, pp. 1–12 and Figures 1–5, filed Jul. 31, 2000.

* cited by examiner

*Primary Examiner*—Ario Etienne
*Assistant Examiner*—LaShonda Jacobs
(74) *Attorney, Agent, or Firm*—Trop, Pruner & Hu, P.C.; Harden E. Stevens, III; John D. Cowart

(57) ABSTRACT

A database system is accessible by a client system over a data network. In one arrangement, a server system is connected to the data network to receive requests from the client system. In response to the request, the server system issues corresponding queries to the database system to retrieve data. The data is then formatted by the server system and sent to the client system, where the formatted data is displayed, such as in a browser screen. The formatted data includes hyperlinks that are user selectable to retrieve further objects from the database system. When selection of the hyperlink is received, the client system sends a request to the server system, which retrieves the requested object or objects from the database system. The objects are communicated back to the client system for presentation.

31 Claims, 6 Drawing Sheets

ACCESSING DATA FROM A DATABASE OVER A NETWORK

TECHNICAL FIELD

The invention relates to accessing data from a database.

BACKGROUND

Database systems are used to collect and store various types of information that are later extracted for viewing or manipulation. Various different types of database systems exist, including relational database systems, object relational database systems, and others.

A user usually gains access to a database system through a client system that is coupled to the database system over a network. In response to commands entered or selected by a user, the client system issues requests to the database system for desired data. Upon receiving data from the database system, the client system presents the received data to the user in some predetermined format.

Relational database systems store data in relational tables. When a query, such as a Structured Query Language (SQL) query is received, a subset of the data is extracted from the relational tables. Typical data types defined in relational databases include relatively simple data types, such as integers, real numbers, and character strings. Database systems have also been developed to store and manipulate more sophisticated data types, such as audio data, video data, multimedia data, image data, formatted documents, maps, and so forth. One example of a database system that is capable of supporting such data types is an object relational database system. However, although object relational database systems are able to store a larger variety of data types, a convenient display and other presentation mechanism has not been provided for some of the relatively complex data types of object relational database systems.

SUMMARY

In general, in accordance with one embodiment, a system comprises an interface to receive a request from a client system for information in a database system and a controller to format metadata associated with the requested information into a format for display in a client system. The controller maps plural data types in the database system with an object type to enable identification of a presentation program for presenting data from the database system.

In general, in accordance with another embodiment, a method of accessing an object relational database comprises receiving metadata relating to requested information from the object relational database and displaying at least a portion of the metadata as a hyperlink. In response to selection of the hyperlink, a request is sent for an object in the object relational database, the object containing information associated with the selected metadata portion. The object is associated with one of plural presentation routines to present the information in the object.

Other features and embodiments will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
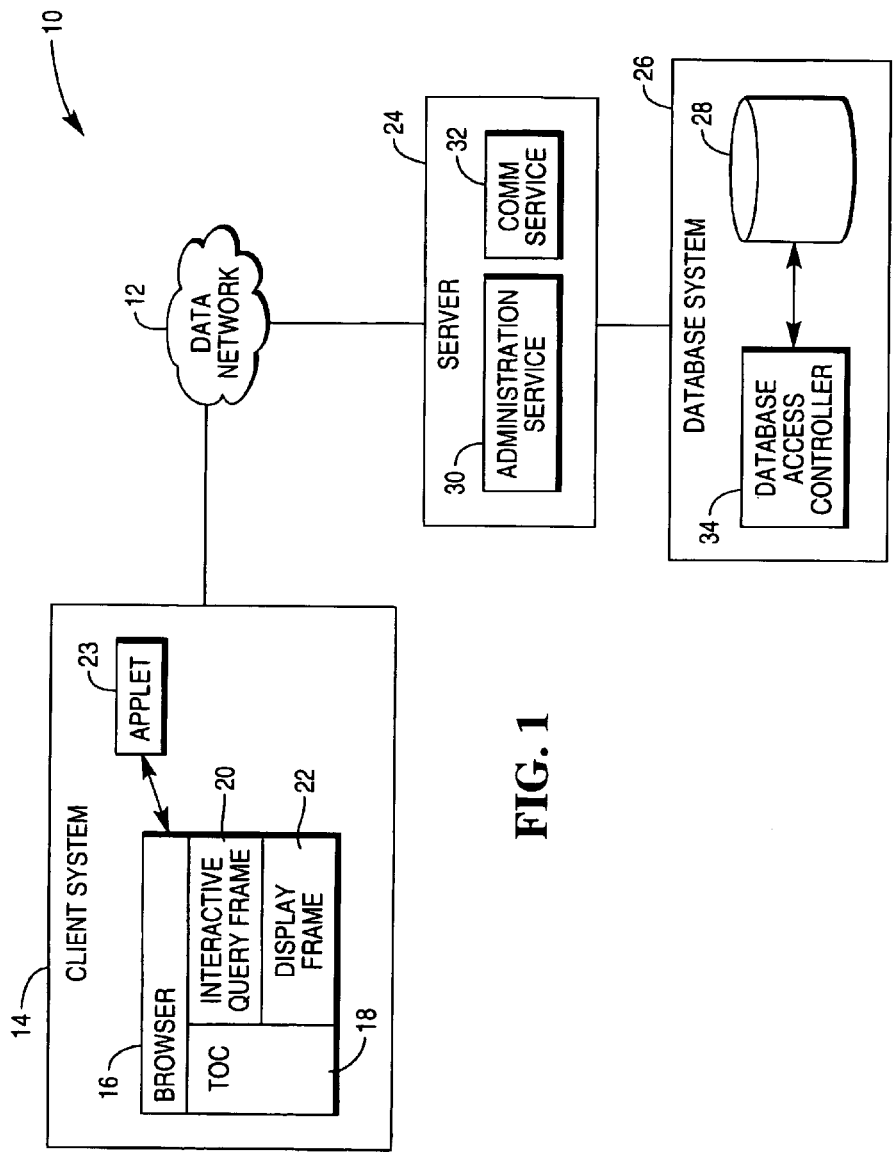
FIG. 1 is a block diagram of an embodiment of a communications system having a client system, a server system, and a database system.

Referring to FIG. 1, in one example arrangement, a communications system 10 includes a client system 14, a server system 24, and a database system 26. The client system 14 is coupled to the server system 24 over a data network 12, which in one embodiment is a packet-based network such as a local area network (LAN), a wide area network (WAN), or the Internet. The server system 24 is capable of receiving requests from the client system 14 for information in the database system 26. In one example, the database system 26 is an object relational database system. In other embodiments, other types of database systems are employed.

The client system 14 includes a display in which a browser screen 16 is presented. The browser screen 16 includes several frames 18, 20, and 22. The frame 18 is a table of contents frame that in one embodiment is a multi-level tree structure that permits a user to select actions to perform with respect to the database system 26. One of the actions that is selectable from the table of contents frame 18 is the creation of an interactive query frame 20 in which a user enters queries, such as Structured Query Language (SQL) queries, to extract data from the database system 26. SQL is a database query language defined by the American National Standards Institute (ANSI). Results of user actions, including responses to queries from the interactive query frame 20, are displayed in a display frame 22 in the browser screen 16.

To provide the interactive feature of the query frame 20, an applet 23 is executed in the client system 14 to present the user interface of the interactive query frame 20 as well as to receive queries entered by the user. The applet 23 also initiates communication of the user-entered queries to the server system 24 over the data network 12.

The display frame 22 is capable of displaying various information, including metadata relating to information in the database system 26. The metadata includes information describing the data selected from the database system 26 in response to the query. In one embodiment, at least a portion of the metadata is displayable as hyperlinks in the display frame 22. The display frame 22 is also capable of displaying various objects retrieved from the database system 26 in response to user selection of hyperlinks or other requests.

A "hyperlink" refers to an element that contains a label (presentable in a display) and link information, such as a uniform resource locator (URL), that defines a link to another object, such as a servlet or a CGI (Common Gateway Interface) routine residing in the server system 24. Hyperlinks are typically defined in documents, sometimes referred to as hypertext documents that provide for the display of various types of information. For example, hypertext documents define web pages that are displayable in a browser window, with the web pages containing formatted text, images, and hyperlinks that are selectable by users to link to other resources. Typical languages used to describe such hypertext documents include the Hypertext Markup Language (HTML), Extensible Markup Language (XML), Wireless Markup Language (WML), or other similar languages.

An "applet," such as the query applet 23, is a program that executes from within another application program rather than from an operating system. Applets are typically written in the JAVA programming language, although applets can also be written in other programming languages. Unlike compiled programs written in some programming languages, JAVA programs are not specific to a physical machine. Instead, JAVA programs may run wherever a JAVA virtual machine resides. The JAVA virtual machine is an independent application installed on a machine, or it can be embedded in an operating system or a web browser.

The server system 24 includes a communications service 32 that receives requests over the data network 12 from the client system 14 (and other client systems) for information in the database system 26. The communication service 32 translates such requests into queries or requests to the database system 26. The server system 24 also includes an administration service 30, which performs various administrative tasks, such as mapping of data types from the database system 26 to a known extension or type that can be understood by the client system 14. Also, the administration service 30 loads appropriate applets into the client system 14, including the query applet 23, to enable the presentation of a user interface (e.g., web interface) in which database queries can be entered as well as to perform tasks in response to user selections made in the user interface.

The database system 26 includes a database 28 and a database access controller 34. In response to requests received from the communications service 32 in the server 24, the database access controller 34 extracts the appropriate subset of information from the database 28 and communicates the extracted information to the server system 24.

The server system 24 effectively provides a common gateway to the database system 26 so that a variety of client devices are able to access the database system 26 if the client devices have respective network interfaces to the data network 12. The client devices include wired devices (coupled by wired connections to the data network) and wireless devices (coupled by wireless connections to the data network 12). Although shown as separate components, the server system 24 and the database system 26 can be implemented on the same platform. In addition, the combination of the server system 24 and the database system 26, when considered from the client system's perspective, can be considered an integrated "database system."

In accordance with some embodiments, a data delivery mechanism that is server-based is provided. Many tasks related to enabling and performing database access operations are performed by the server system 24. For example, the server system 24 loads one or more applets and files into the client system 14 to present the user interface and to process database requests and other user actions. Also, the server system 24 maps data types stored in the database system 26 to file extensions or types that are recognizable by the client system 14 so that data extracted from the database system 26 can be presented in the client system.

Further, with some types of extracted data, such as streaming data, the server system 24 stores the object retrieved from the database, with a stream of data transported to the client system 14 for presentation. As a result, the client system 14 only needs to store a portion of the object at any one time so that the entire object does not need to be stored in the client system 14. "Streaming data" refers to any type of data that is presented as a substantially continuous stream, such as audio data or video data. By storing the object (e.g., object containing an audio file or video file) in the server system 24 instead of in the client system 14, the storage capability of the client system 14 does not need to be large. This may be significant where the client system 14 is a handheld device, such as personal digital assistant (PDA) or mobile telephone with relatively limited data storage capacity.

Figure 2A:
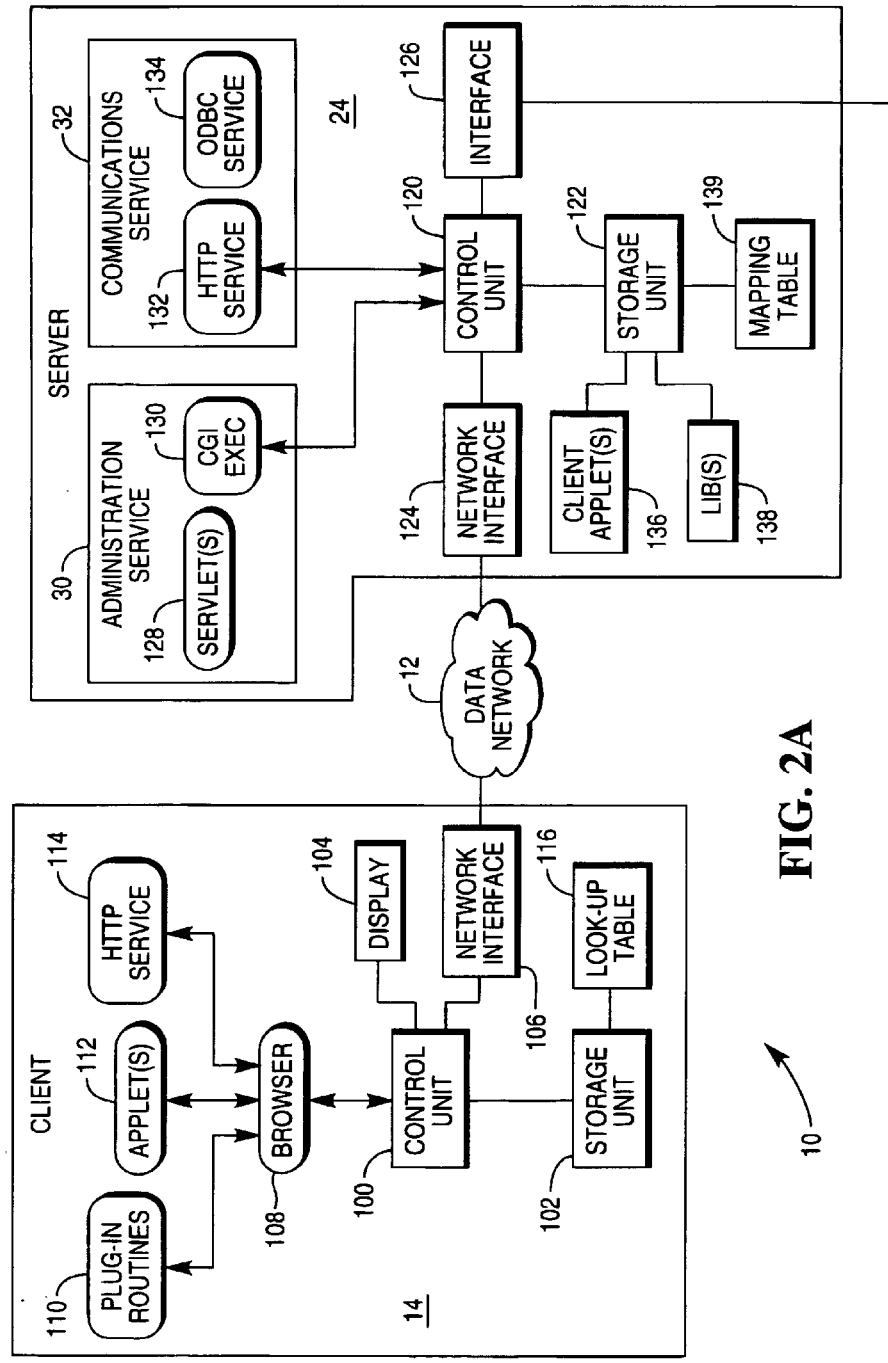
FIG. 2 is a block diagram of components of the client system, server system, and database system of FIG. 1.
Figure 2B:
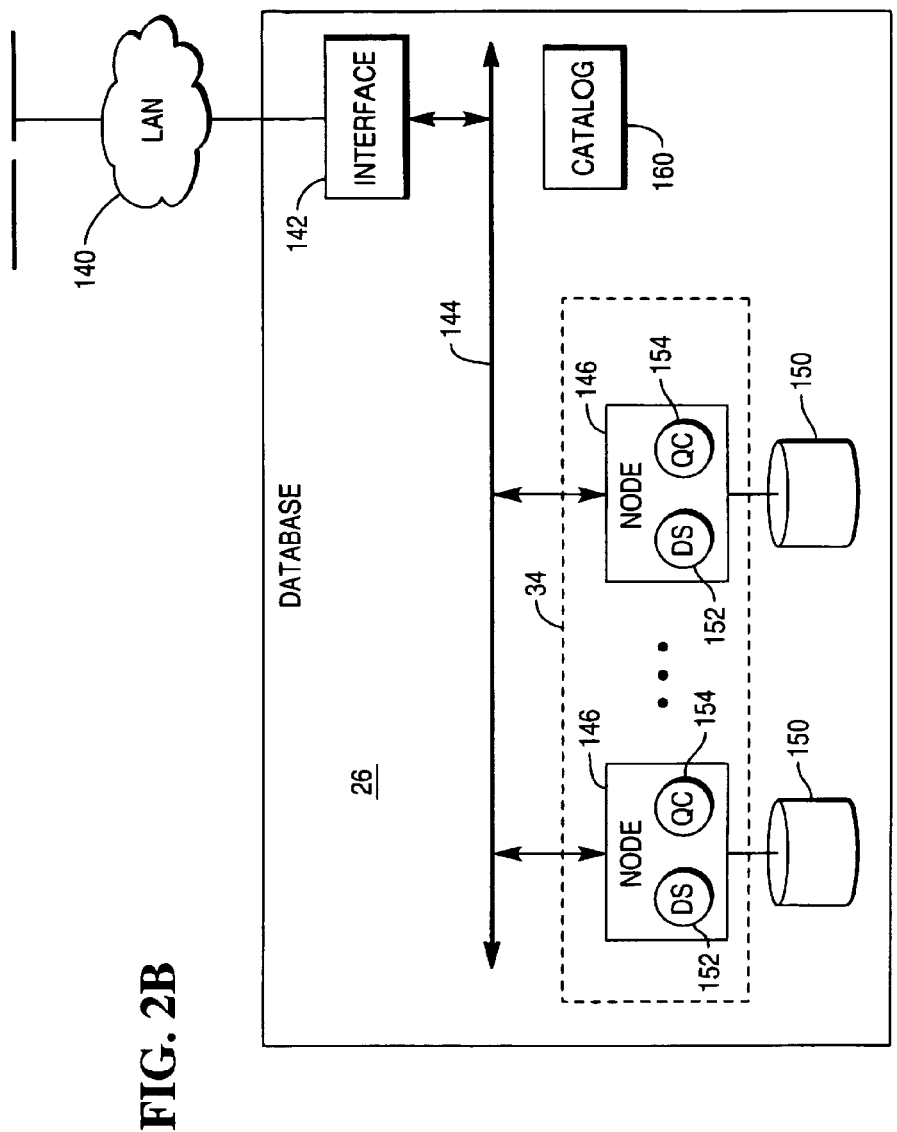

Referring to FIG. 2, components of the client system 14, server system 24, and database system 26 in accordance with one example arrangement are illustrated in greater detail. The client system 14 includes a control unit 100 and a storage unit 102. Various software routines are executable on the control unit 100, including a browser 108, applets 112 (which include the query applet 23 of FIG. 1), plug-in routines 110 to enable the viewing or other presentation of various types of data in the browser screen 16 (FIG. 1), and an HTTP (Hypertext Transfer Protocol) service 114 to manage communications with the server system 24 over the data network 12. HTTP specifies how a client and server establish a connection, how the client requests data from the server, how the server responds to the request, and how the connection is closed. One version of HTTP is described in RFC 2068, entitled "Hypertext Transfer Protocol—HTTP/1.1," dated January 1997.

The browser 108 is capable of displaying information (such as the browser screen 16) in a display 104. In addition, the client system 14 communicates with the data network 12 through a network interface 106.

The server system 24 similarly includes a network interface 124, which is connected to a control unit 120 and a storage unit 122. Routines associated with the administration service 30 and the communications service 32 are executable on the control unit 120. The administration service 30 includes one or more servlets or CGI routines 130.

A servlet is basically a server-side applet that performs predetermined tasks in the server system 24. A servlet can be written in the Java programming language and provide a component-based, platform-independent method for building web-based applications that run on servers. A CGI routine enables data sharing between a client and a server, even if the systems reside on different platforms. CGI permits interactivity between a client and a host operating system over the Internet via HTTP. CGI enables external gateway programs to interface with information servers by allowing a client visiting a website to run a program on the server providing the website to perform specified tasks.

The communications service 32 includes an HTTP service 132 to receive and process HTTP requests and to transmit responses to the HTTP requests, and an ODBC (Open Database Connectivity) service 134 to manage communication of requests to the database system 26. The ODBC interface is a call-level interface to enable an application to communicate with a database manager.

The storage unit 122 in the server system 24 stores client applets 136 and database libraries 138. The client applets 136 can be uploaded to the client system 14 to be executed as applets 112, and the libraries 138 provide the platform-specific functions for the administration service 30. A second network interface 126 in the server system 24 is coupled to a LAN 140 (or other type of network) to communicate with the database system 26.

In the illustrated embodiment, the database system 26 includes multiple nodes 146 each coupled to a corresponding data store 150. The multiple nodes 146 are part of the database access controller 34, and the plural data stores 150 are part of the database 28. In an alternative embodiment, the database system 26 is a single-node system.

Each node includes a data services (DS) routine 152 to control access to the respective data store 150. In addition, a query coordinator (QC) routine 154, executable on one node or on a plurality of nodes, controls the processing of received queries, such as from the server system 24. The nodes 146 are coupled to an interconnect network 144. In addition, a network interface 142 is connected between the interconnect network 144 all and the LAN 140.

Figure 3:
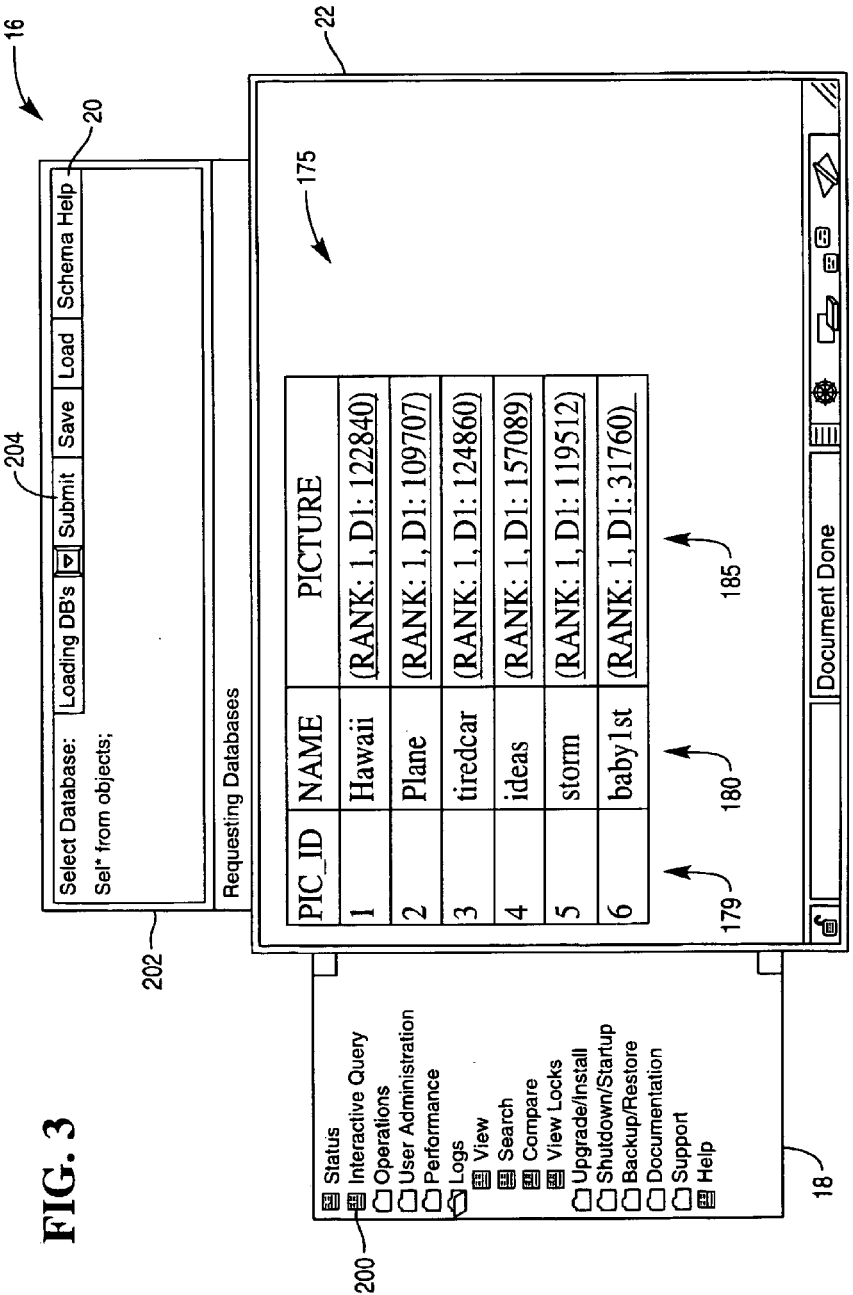
FIG. 3 is a view of database information displayed in a table format, including hyperlinks to objects of the database system of FIG. 1.

Referring to FIG. 3, an example browser screen 16 that is displayable in the client system 14 is illustrated. As discussed above, the screen 16 includes three frames 18, 20, and 22. The table of contents frame 18 includes various elements that are selectable by a user. One element is an interactive query element 200 that when selected by a user causes the interactive query frame 20 to be displayed. The interactive query frame 20 includes an input window 202 in which a user can enter an SQL statement. In the illustrated example, the string "SEL * FROM OBJECT;" has been entered into the window 202.

When the user activates the "SUBMIT" button 204 in the query frame 20, the SQL string in the window 202 is communicated to the server system 24, which in turn sends a request to the database system 34. In response to the request, metadata associated with the requested information is communicated back to the server system 24, which formats the metadata into a table format, which can be an HTML, XML, or WML format with appropriate tags added. The formatted data is communicated to the client system 14, where it is displayed in the display frame 22 of the browser screen 16. The formatted data is displayed as a table 175 having a number of rows and columns. In the illustrated example, each row corresponds to a different image that is stored in the database system 26. The first column 179 provides the identifier PIC_ID of each image, and the second column 180 lists the names of the images. In the third column 185, hyperlinks corresponding to each image object are provided to enable user selection to retrieve the image objects. The retrieved image object is displayed in the display frame 22.

In accordance with some embodiments of the invention, metadata (in the form of the table 175) is communicated to the client system 14 in response to the request sent from the query frame 20 without retrieving the image objects. This reduces the amount of information transported from the database system 26 to the client system 14. It is only after user selection of one of the hyperlinks that the appropriate one of the image objects is retrieved from the database system 26. With large objects, the reduction in the amount of communicated information from the database system 26 to the client system 14 is substantial.

In addition, objects containing streaming data (e.g., audio data or video data), which can be relatively large files, are stored in the server system 24 instead of transported in their entirety to the client system 14. The streaming data is delivered as a substantially continuous stream that the client system 14 presents as data is received. Thus, as any given time, the client system 14 needs to store only a portion of a retrieved object instead of the entire object.

Figure 4:
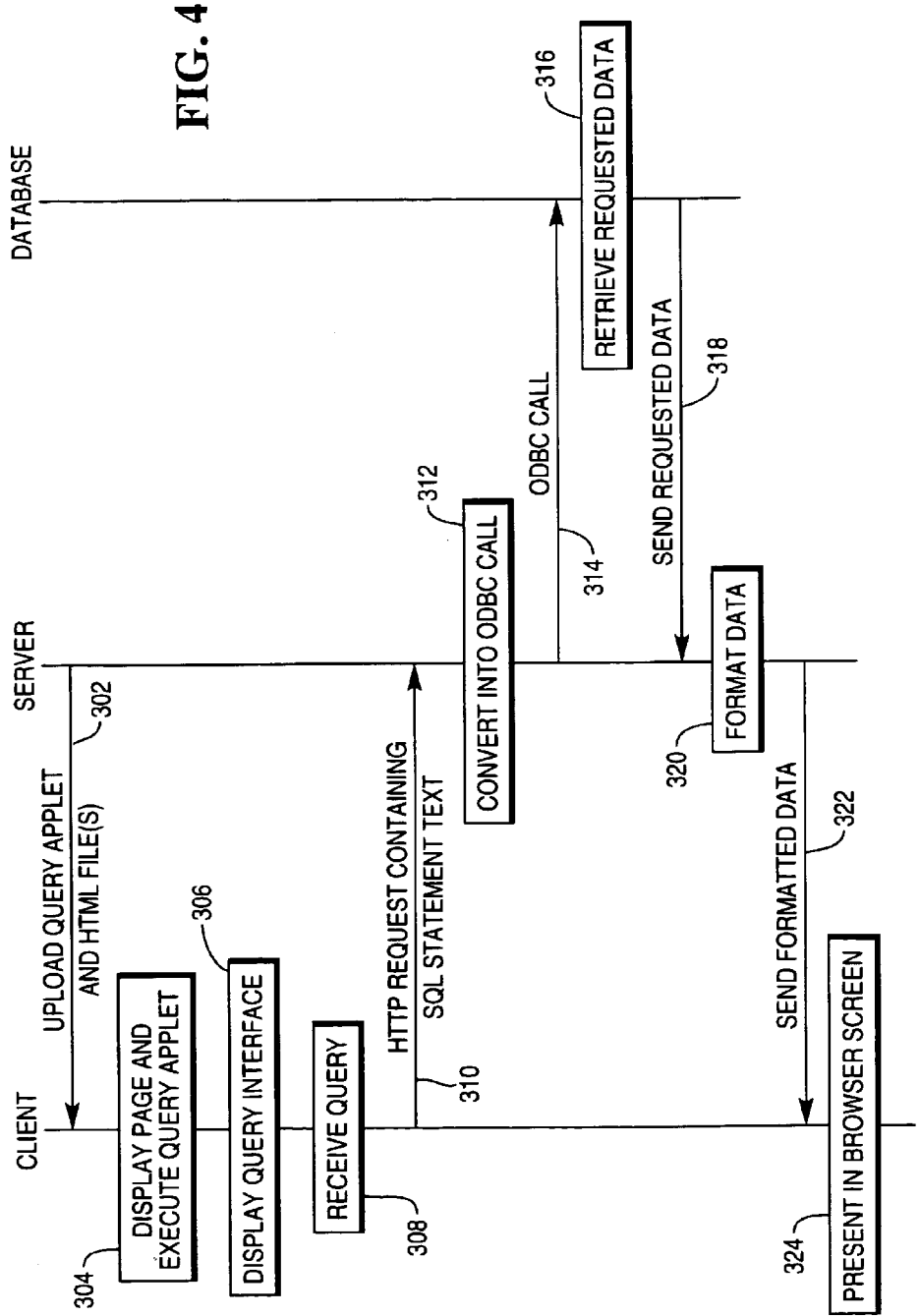
FIGS. 4 and 5 are message flow diagrams of actions performed by, and messages communicated among, the client system, the server system, and the database system of FIG. 1.

Referring to FIG. 4, actions performed by, and messages exchanged between, the client system 14, server system 24, and database system 26 are illustrated. In response to a predetermined event, the server system 24 uploads (at 302) the query applet 23, and optionally other applets, to the client system 14. One or more HTML files (or XML or WML files) can also be transported to the client system 14 to enable the display of the web browser screen 16. The query applet 23 when executed creates the interactive query frame 20. The query applet 23 and HTML files can be uploaded in response to one of various events. For example, a user may access a web site provided by the server system 24 to request access to the database system 26. After entry of a user name and password (or performance of another security action), the server system 24 transports the HTML files and applets to the client system 14 to enable database access.

The one or more HTML files are displayed as a web page in the browser screen 16 (with the three frames 18, 20, and 22 presented), and the query applet 23 is automatically executed (at 304) to create the content of the interactive query frame 20. Alternatively, the client system 14 may wait for user selection of an element (such as element 200) in the table of contents frame 18. Upon execution of the query applet 23, the query interface in the query frame 20 is displayed (at 306). When a query (in the form of an SQL statement, for example) entered by a user is received (at 308), the client system 14 sends an HTTP request (at 310) to the server system. The HTTP request contains various parameters that correspond to the SQL statement entered in the query frame 20. The parameters can be part of a URL contained in the HTTP request. The server system 24 converts the HTTP request into an ODBC call (at 312) containing an SQL query, which is communicated (at 314) to the database system. Instead of an ODBC call, an alternative embodiment may employ a different type of request communicated to the database system. In response to the SQL query, the database system 24 retrieves (at 316) the requested data, and sends (at 318) the requested data back to the server system.

At the server system 24, the received data is formatted (at 320) for display in the client system 14. In one example, HTML, XML, or WML tags are added to the data to place it into the HTML, XML, or WML format so that the data can be displayed as a web page. The formatted data is communicated (at 322) to the client system 14. Upon receipt of the formatted data, the client system 14 presents the formatted data (at 324) in the browser screen 16, which is displayed in the display frame 22. One example of the formatted data is the table 175 shown in FIG. 3.

Figure 5:
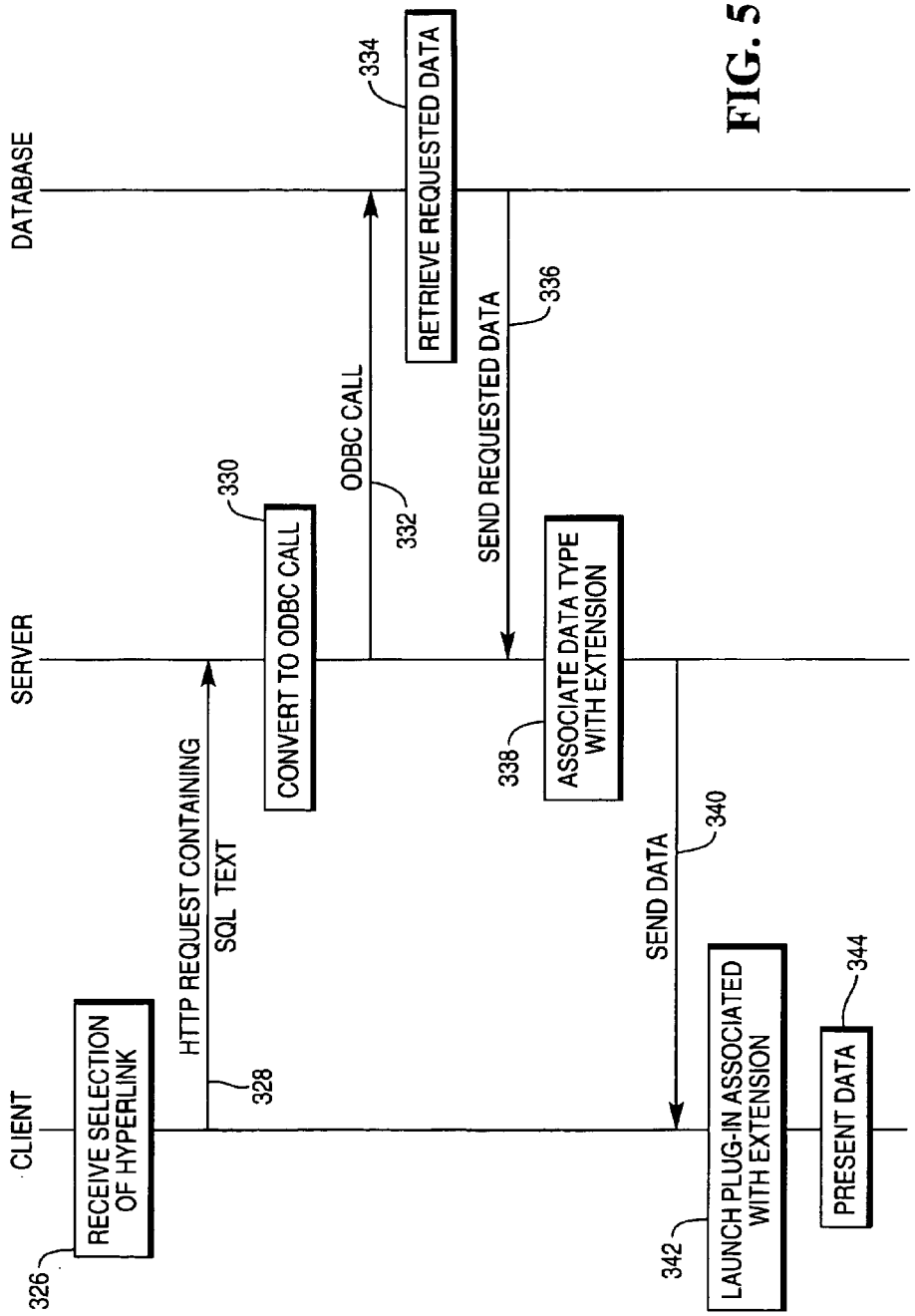

Referring to FIG. 5, the table 175 presented in the display frame 22 includes hyperlinks that are selectable by the user to retrieve the corresponding object from the database 28 (FIG. 1). Upon receiving a selection (at 326) of one of the hyperlinks, the client system 14 sends an HTTP request containing parameters corresponding to the selection of the hyperlink. The server system 24 converts (at 330) the request to an ODBC call containing an SQL query, which is communicated (at 332) to the database system 26. The database system 26 retrieves the requested object (at 334), such as an audio object, image object, video object, multimedia object, geospatial object, or other object. The requested object is sent (at 336) to the server system 24, which associates the data type of the object (as defined in the database 28) with a file extension or type that is recognizable by the client system 14. An example mapping table 139 is shown below in Table 1.

TABLE 1

| DATA TYPE | EXTENSION |
| --- | --- |
| AUDIO | .WAV |
| VIDEO2 | .MPG |
| VIDEO1 | .MPG |
| VIDEO | .MPG |
| IMAGE | .JPG |
| CLOB | .TXT |
| TEXT | .TXT |
| GIF | .GIF |

In Table 1, example data types in the database system includes AUDIO, VIDEO2, VIDEO1, VIDEO, IMAGE, CLOB, TEXT, and GIF. The corresponding file extensions associated with the data types include .WAV, .MPG, .MPG, .MPG, .JPG, .TXT, .TXT, and .GIF, respectively. By associating a data type of the database system 26 with an extension (or file type), a convenient mechanism is provided to the client system 14 to launch the appropriate presentation routine for presenting the information in the retrieved objects. For example, an audio player may be launched to present audio data, a video viewer may be launched to present video data, and other routines may be launched to present other types of information.

The data, which is in the form of a file with the appropriate extension (e.g., FILE1.WAV, FILE2.MPG, FILE3.JPG, FILE4.TXT, FILE5.GIF) is sent (at 340) to the client system 14, which launches (at 342) the appropriate plug-in routine associated with the extension of the received file. Once the plug-in routine is launched, the received data is presented (at 344) in the display frame 22 of the browser screen 16.

Optionally, presentation information is stored in a catalog 160 (FIG. 2) stored in one or more of the data stores 150 in the database system 26. The catalog 160 is a table containing attributes of the various tables in the database system 26. The presentation information in one embodiment includes rules for invoking the presentation method (e.g., to view an image or video or to play audio data). As examples, the rules define a default executable code to invoke and the parameters used for invoking the executable code by the browser in the client system 14. These rules are communicated to the server system 24 to assist the server system in mapping a data type to an extension.

Further, the executable code itself (e.g., an applet) for presenting information can be stored in the catalog 160. Thus, when an object is requested and retrieved from the database system 26, the associated executable code for presenting the object data can also be retrieved and communicated to the client system 14, which executes the code to present the object data. An advantage of using an applet as the executable code is that it may be brought over from the server and thus need not be pre-installed. The alternative, using a plug-in with the browser, typically provides faster availability to the user for presenting the data communicated from the database system.

The various devices and systems discussed each includes various software routines or modules. Such software routines or modules are executable on corresponding control units, such as control units 100 and 120 in FIG. 2. The control units include microprocessors, microcontrollers, processor cards (including one or more microprocessors or microcontrollers), or other control or computing devices. As used here, a "controller" refers to a hardware component, software component, or a combination of the two.

The storage units referred to in this discussion include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; or optical media such as compact disks (CDs) or digital video disks (DVDs). Instructions that make up the various software routines or modules in the various devices or systems are stored in respective storage units. The instructions when executed by a respective control unit cause the corresponding device or system to perform programmed acts.

The instructions of the software routines, or modules are loaded or transported to each device or system in one of many different ways. For example, code segments including instructions stored on floppy disks, CD or DVD media, a hard disk, or transported through a network interface card, modem, or other interface device are loaded into the device or system and executed as corresponding software routines or modules. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the present invention has been described with respect to a limited number of embodiments, those skilled in the art will appreciate numerous modifications and variations therefrom. It is intended that the appended claims cover such modifications and variations as fall within the true spirit and scope of this present invention.

What is claimed is:

1. A system comprising:
    an interface to receive a request from a client system for information in a database system; and
    a controller to format metadata associated with the requested information into a format for display in the client system, wherein said controller is adapted to map plural data types defined by the database system to corresponding files types to enable presentation in the client system of an object having an associated data type retrieved from the database system,
    wherein said controller is adapted to further map plural data types to the corresponding files types based on a table having multiple entries each associating a data type defined by the database system with a file extension corresponding to a respective file type, and
    wherein the controller is adapted to create a file name for the object, the file name containing the file extension mapped for the data type of the object, and to send a file having the file name to the client system, the file containing the object.

2. The system of claim 1, wherein the controller comprises a network communications service to receive the request from the client system.

3. The system of claim 2, wherein the network communications service comprises a Hypertext Transport Protocol service.

4. The system of claim 1, the controller to format the metadata into a predetermined format displayable by a browser.

5. The system of claim 4, wherein the predetermined format comprises a format selected from the group consisting of a Hypertext Markup Language format, an Extensible Markup Language format, and a Wireless Markup Language format.

6. The system of claim 1, wherein the database system comprises an object relational database system.

7. The system of claim 1, wherein the plural data types comprise two or more of the following: audio data, video data, multimedia data, image data, and geospatial data.

8. The system of claim 1, further comprising a storage element containing an object retrieved from the database system, the controller to communicate data in the object as a stream to the client system.

9. The system of claim 8, wherein the controller communicates portions of the object to the client system in the stream so that the entire object need not be communicated to the client system for storage.

10. The system of claim 1, wherein the metadata comprises a hyperlink.

11. The system of claim 10, the interface to receive a second request indicating selection of the hyperlink, the hyperlink corresponding to the object in the database system.

12. The system of claim 1, wherein the metadata contains a description of plural objects in the database system.

13. The system of claim 12, wherein the description comprises hyperlinks corresponding to the plural objects.

14. The system of claim 1, wherein the controller is adapted to further receive presentation information stored in the database system, the presentation information defining a manner in which the requested information is to be presented by the client system.

15. The system of claim 14, wherein the controller is adapted to use the presentation information to map the data types to the file types.

16. A method of accessing an object relation database, comprising:
    loading an applet over a network from a server;
    executing the applet to present an interactive interface in a browser display screen to receive user queries and to send requests for information from the object relational database in response to the user queries;
    receiving metadata relating to requested information from the object relational database;
    displaying at least a portion of the metadata as a hyperlink;
    in response to selection of the hyperlink, sending a request for an object in the object relational database, the object containing information associated with the selected metadata portion;
    associating the object with one of plural presentation routines to present the information in the object;
    mapping plural data types stored in the object relational database to corresponding plural file types; and
    identifying a file type of the object based on the mapping, wherein mapping the plural data types to corresponding plural file types comprises mapping, based on a mapping table, the plural data types defined by object relational database to the corresponding file types, wherein the mapping table has entries mapping a data type to a corresponding file extension with a respective file type.

17. The method of claim 16, wherein associating the object with one of plural presentation routines is based on the file type of the object.

18. The method of claim 16, further comprising invoking the one presentation routine as a plug-in to a browser.

19. The method of claim 16, further comprising:
    receiving at least one of a Hypertext Markup Language (HTML), Extensible Markup Language (XML), and Wireless Markup Language (WML) file to present the browser display screen.

20. The method of claim 19, wherein the at least one of the HTML, XML, and WML file causes a first frame to be presented in the browser display screen, the method further comprising invoking the applet in response to user selection of an element in the first frame,
    wherein the interactive interface is presented in a second frame in the browser display screen.

21. An article comprising at least one storage medium containing instructions that when executed cause a first system to:
    receive a request from a client system for data in a database;
    retrieve the data from the database type; and
    determine a data type of the retrieved data and map the data type to a file type presentable by the client system type, wherein mapping the data type to the file type comprises accessing a table having multiple entries to map plural data types associated with data stored in the database with corresponding plural file types presentable by the client system, each entry of the table associating a data type defined by the database with a file extension corresponding to a respective file type, and
    wherein the instructions when executed cause the first system to further create a file name for the retrieved data, the file name containing the file extension mapped for the data type of the retrieved data, and to further send a file having the file name to the client system, the file containing the retrieved data.

22. The article of claim 21, wherein the instructions when executed cause the first system to:
    retrieve metadata describing the requested data; and
    format the metadata according to a predetermined format displayable by the client system.

23. The article of claim 22, wherein the predetermined format comprises one of a Hypertext Markup Language format, an Extensible Markup Language format, and a Wireless Markup Language format.

24. The article of claim 22, wherein the metadata comprises a hyperlink, the instructions when executed causing the first system to receive activation of the hyperlink and to retrieve the data in response to the activation of the hyperlink.

25. The article of claim 21, wherein the instructions when executed cause the first system to retrieve an object from an object relational database.

26. The article of claim 21, wherein the database stores rules pertaining to presentation of the data in the client system, the instructions when executed causing the first system to access the rules to map the data type to the file type.

27. A system comprising:
    one or more storage devices containing an applet and a document;
    an interface to a network;
    a controller to communicate the document to a client device, the document containing data defining a page displayable in a browser screen, and the applet containing instructions that when executed provide an interactive portion of the browser screen to enable user entry of Structured Query Language (SQL) queries, wherein said applet responsive to SQL queries entered in the interactive portion of the browser screen by sending corresponding requests for accessing data in a database system; and wherein the controller is adapted to create a file name for the object, the file name containing the file extension mapped for the data type of the object, and to send a file having the file name to the client system, the file containing the object.

28. The system of claim 27, wherein the applet is invoked in response to user selection of an element in a first frame of the browser screen, the interactive portion being part of a second frame of the browser screen.

29. The system of claim 28, wherein the browser screen comprises a third frame to display a result page in response to a request for data in the database system, the result page containing at least one hyperlink selectable by a user to retrieve an object from the database system.

30. A system comprising:

an interface to receive a request from a client system for information in a database system; and a controller to format metadata associated with the requested information into a format for display in the client system; wherein said controller is adapted to map plural data types in the database system to corresponding files types to enable presentation in the client system of an object having an associated data type retrieved from the database, wherein the controller is adapted to communicate the requested information and executable code associated with the requested information to the client system, the executable code for presenting the requested information in the client system, and wherein the controller is adapted to create a file name for the object, the file name containing the file extension mapped for the data type of the object, and to send a file having the file name to the client system, the file containing the object.

31. An article comprising at least one storage medium containing instructions that when executed cause a first system to:

receive a request from a client system for data in a database;

retrieve the data from the database; and determine a data type of the retrieved data and map the data type to a file type presentable by the client system type;

wherein mapping the data type to the file type comprises accessing a table having multiple entries to map plural data types associated with data stored in the database with corresponding plural file types presentable by the client system;

wherein the instructions when executed cause the first system to communicate executable code stored in the database and associated with the retrieved data to the client system, the executable code for presenting the retrieved data in the client system, and wherein the instructions when executed cause the first system to further create a file name for the retrieved data, the file name containing the file extension mapped for the data type of the retrieved data, and to further send a file having the file name to the client system, the file containing the retrieved data.

* * * * *